United States Patent
Hatanaka

(10) Patent No.: US 8,648,925 B2
(45) Date of Patent: Feb. 11, 2014

(54) CONTROL APPARATUS, CONTROL METHOD, AND CONTROL SYSTEM FOR REPRODUCING CAPTURED IMAGE DATA

(75) Inventor: Koji Hatanaka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/327,474

(22) Filed: Dec. 15, 2011

(65) Prior Publication Data

US 2012/0162461 A1    Jun. 28, 2012

(30) Foreign Application Priority Data

Dec. 28, 2010   (JP) ................................. 2010-293010

(51) Int. Cl.
  *H04N 5/225* (2006.01)
  *H04N 5/222* (2006.01)

(52) U.S. Cl.
  USPC ................................. 348/220.1; 348/333.11

(58) Field of Classification Search
  USPC .................. 348/220.1, 222.1, 333.01, 333.11
  See application file for complete search history.

(56) References Cited

U.S. PATENT DOCUMENTS

| | | | |
|---|---|---|---|
| 5,592,301 A * | 1/1997 | Shimada | 386/224 |
| 7,088,387 B1 * | 8/2006 | Freeman et al. | 348/155 |
| 2003/0081127 A1 * | 5/2003 | Kirmuss | 348/207.99 |
| 2010/0265344 A1 * | 10/2010 | Velarde et al. | 348/208.16 |

FOREIGN PATENT DOCUMENTS

JP      2000-350135 A     12/2000

* cited by examiner

*Primary Examiner* — Timothy J Henn
(74) *Attorney, Agent, or Firm* — Canon U.S.A., Inc. IP Division

(57) ABSTRACT

There is provided an imaging apparatus that continuously reproduces, if first moving image data is acquired by imaging in a first imaging mode for capturing a moving image for a predetermined period of time, and then automatically stopping the capturing of the moving image, second moving image data captured before the capturing of the moving image related to the first moving image data and acquired by the imaging in the first imaging mode and the first moving image data.

11 Claims, 12 Drawing Sheets

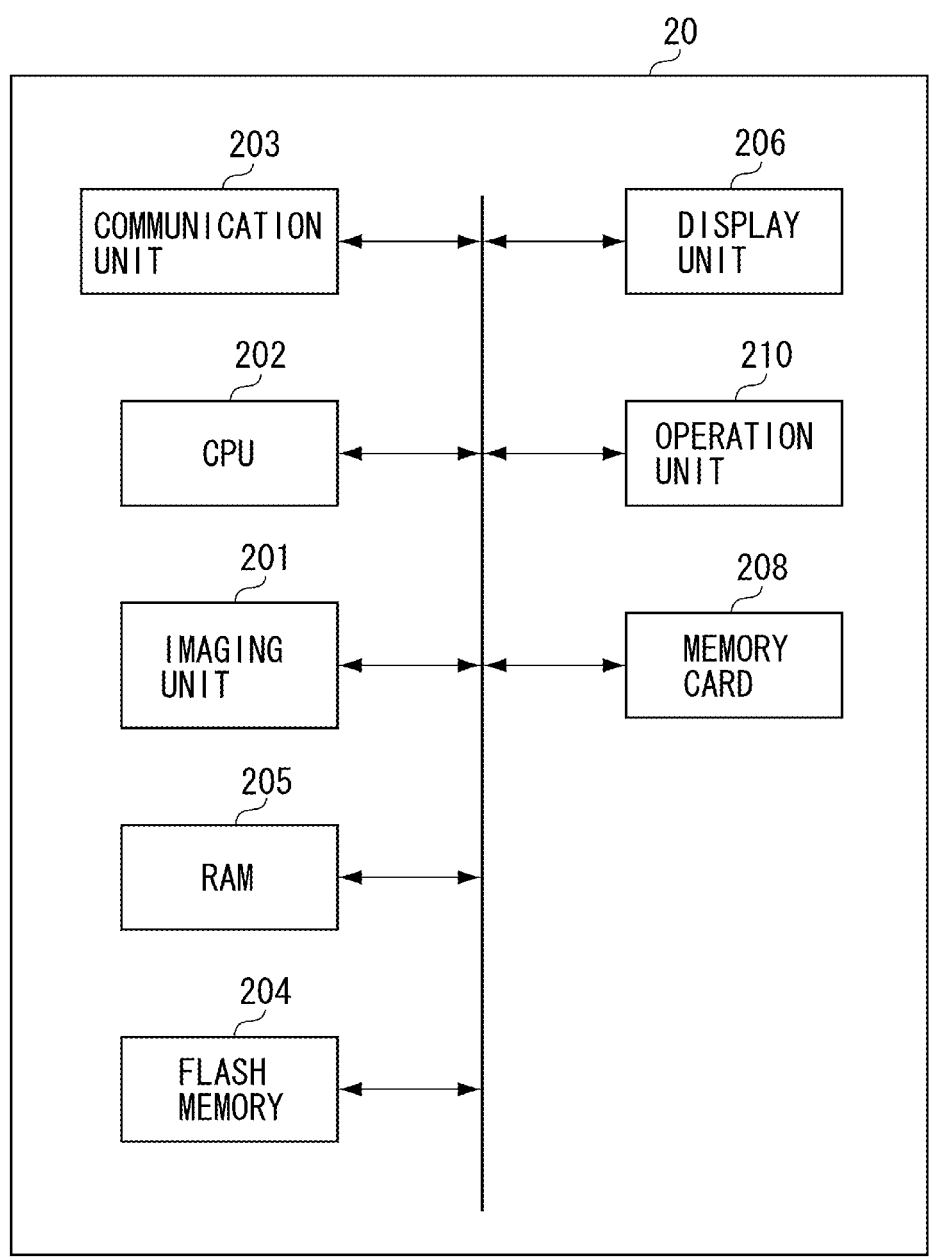

FIG. 3A

¥DCIM -¥100_AAAA- MVS_0001.MOV (SHORT MOVIE) ~301
                  MVS_0002.MOV (SHORT MOVIE) ~302
                  MVS_0003.MOV (SHORT MOVIE) ~303

FIG. 3B

¥DCIM -¥100_AAAA- IMG_0001.JPG (STILL IMAGE) ~311
                  IMG_0002.JPG (STILL IMAGE) ~312
                  MVS_0003.MOV (SHORT MOVIE) ~313
                  MVI_0004.MOV (MOVIE)       ~314
                  IMG_0005.JPG (STILL IMAGE) ~315

CONTROL APPARATUS, CONTROL METHOD, AND CONTROL SYSTEM FOR REPRODUCING CAPTURED IMAGE DATA

BACKGROUND OF THE INVENTION

1. Field of the Invention

The present invention relates to an imaging apparatus, and more particularly to a technology for reproducing captured image data.

2. Description of the Related Art

Conventionally, there has generally been used a function of automatically displaying, when a digital camera captures a still image, acquired still image data by the digital camera immediately after the capturing. This function enables a user to easily check the captured still image data.

In the case of moving image data, when the entire captured moving image data is reproduced to be checked, it is not practical because a period of time equal to that taken for the capturing is necessary.

Thus, there has been proposed a method for checking image capturing by displaying a part of captured moving image data. Japanese Patent Application Laid-Open No. 2000-350135 discusses a method for displaying a start and an end of moving image data to check it.

To reproduce the moving image data, for example, there is available a form of successively reproducing a plurality of short-time moving image data. In such a case, the user may wish to check not only just captured moving image data but also its association with previously captured moving image data.

However, in the technology discussed in Japanese Patent Application Laid-Open No. 2000-350135, only currently captured moving image data is displayed on a checking screen after capturing. As a result, the association between the currently captured moving image data and previously captured moving image data cannot be checked.

SUMMARY OF THE INVENTION

According to an aspect of the present invention, an imaging apparatus includes: an imaging unit configured to execute imaging in a first imaging mode for capturing a moving image for a predetermined period of time and then automatically stopping the capturing and a second imaging mode for capturing the moving image for a period longer than the predetermined period of time; and a reproduction unit configured to automatically reproduce, after imaging executed by the imaging unit, moving image data acquired by the imaging. In this case, if first moving image data is acquired by imaging in the first imaging mode, the reproduction unit continuously reproduces second moving image data captured before capturing of a moving image related to the first moving image data and acquired by the imaging in the first imaging mode and the first moving image data.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 2 illustrates an example of a hardware configuration of the digital camera.

FIGS. 3A and 3B each illustrate an example of a data structure in a recording medium of the digital camera.

DESCRIPTION OF THE EMBODIMENTS

Various exemplary embodiments, features, and aspects of the invention will be described in detail below with reference to the drawings.

Figure 1:
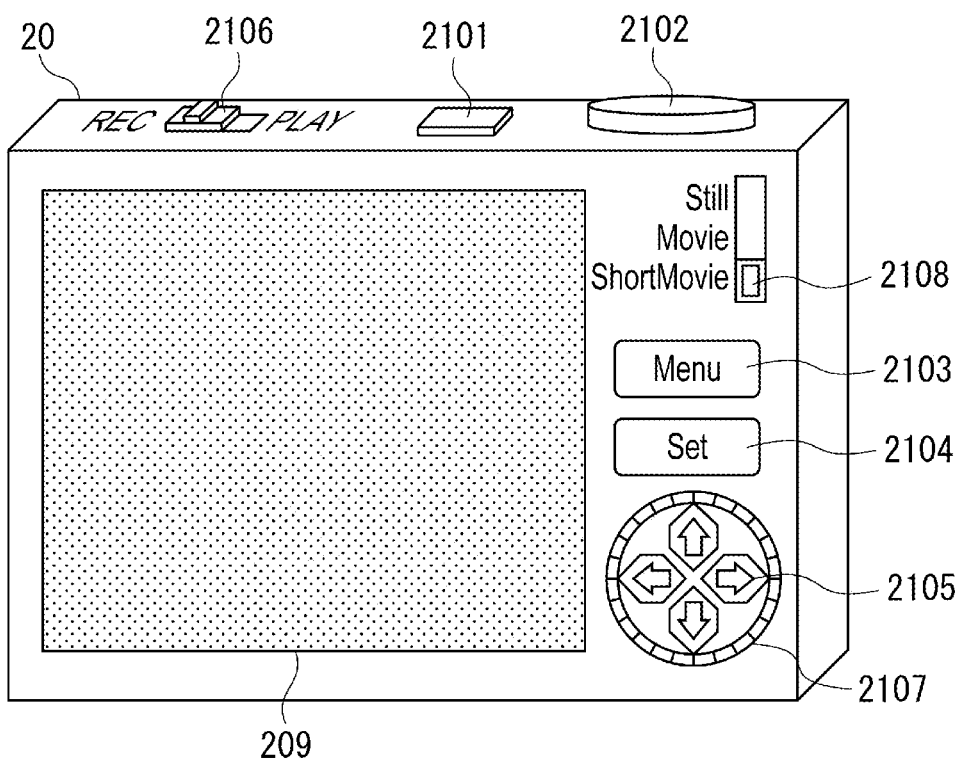
FIG. 1 illustrates an example of an appearance of a digital camera.

A first exemplary embodiment of the present invention is described below. FIG. 1 illustrates an appearance of a digital camera 20 that is an example of an imaging apparatus according to the present invention. The imaging apparatus includes a mobile phone with a camera in addition to the digital camera.

A power button 2101 switches power on/off for the digital camera 20. A REC/PLAY mode changing switch 2106 switches the digital camera 20 between an imaging mode and a reproducing mode. The digital camera 20 becomes the imaging mode to capture an object image when set to a position "REC", and the reproducing mode to reproduce captured image data when set to a position "PLAY".

A shutter button 2102 is an operation unit to perform image capturing. The object is captured by pressing this button. A liquid crystal screen 209 is used for displaying various menus to designate setting. The liquid crystal display 209 is also used for display as a viewfinder in the imaging mode or reproducing captured image data.

A menu button 2103 is an operation unit operated for displaying a menu screen to set a camera operation. When this button is pressed, various menus are displayed on the liquid crystal screen 209.

A setting button 2104, a moving button 2105, and moving wheel 2107 are operation units used when the menu is operated. For example, these components can achieve an operation of moving a cursor on the menu displayed on the liquid crystal screen 209 by an up-and-down button of the moving button 2105, and selecting an item by the setting button 2104.

An imaging mode changing switch 2108 is an operation unit to change the imaging mode. By operating the imaging mode changing switch 2108, images acquired by capturing can be changed to a still image (Still), a normal movie (Movie), and a short movie (Short Movie). The normal movie and the short movie are both types of moving image data, and described in detail below.

FIG. 2 is a block diagram illustrating a configuration of the digital camera 20 according to the present exemplary embodiment. A communication unit 203 connects the digital camera 20 to an external apparatus to transfer a control command or data. The communication unit 203 can perform communication by wire connection such as a Universal Serial Bus (USB) cable, wireless connection such as a wireless Local Area Network (LAN), or by direct connection to the external apparatus.

A Central Processing Unit (CPU) 202 controls various calculations or each unit of the digital camera 20 according to an input signal or program. An imaging unit 201 includes a series of devices to perform image capturing, such as a lens, a diaphragm, a Charge Coupled Device (CCD) sensor, and an image processing apparatus.

A Random Access Memory (RAM) 205 temporarily stores data, and is used as a work area for operating the CPU 202. A flash memory 204 records a program (firmware) for controlling each function of the digital camera 20, and various pieces of setting information. A display unit 206 displays a viewfinder image during image capturing, a captured image, or a menu for a dialogue operation. The display unit 206 also includes the liquid crystal screen 209 illustrated in FIG. 1.

An operation unit 210 receives a user's operation. The operation unit 210 includes the menu button 2103, the moving button 2105, and the moving wheel 2107 illustrated in FIG. 1. A memory card 208 is a nonvolatile recording medium for recording captured image data. In the present exemplary embodiment, the detachable memory card 208 is used. However, a recording medium can be included in the digital camera 20.

The configuration of the digital camera 20 has been described. The digital camera 20 can be controlled not by one hardware component such as the CPU 220 but by a plurality of hardware components in a sharing/cooperative manner. Next, the imaging mode switching in the digital camera 20 according to the present exemplary embodiment is described.

As described above, the digital camera 20 according to the present exemplary embodiment can change a type of captured image data by the imaging mode changing switch 2108 when the REC/PLAY mode changing switch 2106 is set to the position "REC".

First, when the imaging mode changing switch 2108 is set to the position "Still", the digital camera 20 changes to a still mode. In this mode, when the shutter button 2102 is pressed, the digital camera 20 captures a still image, and records the captured still image data in the memory card 208 in, for example, a Joint Photographic Experts Group (JPEG) format.

When the imaging mode changing switch 2108 is set to the position "Movie", the digital camera 20 changes to a normal movie mode. In this mode, when the shutter button 2102 is pressed, the digital camera 20 starts capturing a moving image.

When the shutter button 2102 is pressed again after the start of moving image capturing, the digital camera 20 stops the capturing of the moving image, and records captured moving image data (hereinafter, normal movie) in the memory card 208. In the present exemplary embodiment, the moving image data is recoded in a Motion JPEG format. However, the recording is not limited to this format.

When the imaging mode changing switch 2108 is set to the position "Short Movie", the digital camera 20 changes to a short movie mode that is an example of a first imaging mode. In this mode, when the shutter button 2102 is pressed, the digital camera 20 starts capturing a moving image.

After a predetermined period of time has elapsed, the digital camera 20 automatically stops the capturing of the moving image. In the present exemplary embodiment, the digital camera 20 automatically ends the capturing of the moving image after the digital camera 20 has continued the capturing of the moving image for 4 seconds, and stands by for the shutter button 2102 being pressed again.

In the present exemplary embodiment, even when the shutter button 2102 is pressed during the capturing of the moving image in the short movie mode, the capturing of the moving image is not stopped. In other words, in principle, moving image data (hereinafter, short movie) captured in the short movie mode all become moving image data of 4 seconds. The captured data is recorded in the memory card 208 as in the case of the normal movie mode.

As in the above-described case, the data is recorded in a Motion JPEG format. However, the recording is not limited to this format. A capturing period of time in the short movie mode in the digital camera according to the present exemplary embodiment is 4 seconds. However, the capturing period of time is not limited to this. The capturing period of time can be changed from the menu by a user's operation. In view of continuous reproducing of the short movies described below, it is preferred that the settable capturing period of time in the short movie mode is within 15 seconds.

Thus, the digital camera 20 according to the present exemplary embodiment has the normal movie mode for relatively long moving image capturing and the short movie mode for moving image capturing shorter than that of the normal movie mode. To reproduce the normal movie, a method that ends after reproducing one normal movie from a start to an end is assumed.

An example of a method for reproducing the short movies is continuous reproducing. This enables rendition of a plurality of short scene groups as a series of flows by continuously reproducing short movies of relatively short time.

In other words, a dramatic effect such as a slide show in the still image data can be provided. To separately use the reproducing methods, the digital camera 20 according to the present exemplary embodiment includes both of the normal movie mode and the short movie mode.

Next, operations in the imaging modes of the digital camera 20 according to the present exemplary embodiment are described. FIG. 3A illustrates a directory structure in the memory card 208. The digital camera 20 according to the present exemplary embodiment complies with a Design Rule for Camera File System (DCF) standard. Data is recorded in the memory card 208 in the structure illustrated in FIG. 3A.

The digital camera 20 generates a "XXX_AAAA" (XXX is a numerical value of 100 or more) folder below a "DCIM" folder to store still image data or moving image data. In the present exemplary embodiment, the short movie and the normal movie are stored in difference folders.

In the example illustrated in FIG. 3A, short movies 301, 302, and 303 are stored in a "100_AAAA" folder.

In the digital camera 20, to identify the sill image data, the normal movie, and the short movie, different prefixes (first 4 characters) of file names are added. Specifically, a prefix "IMG_" is added to the still image data, a prefix "MVI_" is added to the normal movie, and a prefix "MVS_" is added to the short movie.

Extensions are the same for the normal movie and the short movie, and hence information is necessary to identify them. In the present exemplary embodiment, the prefixes of the file names identify the short movie and the normal movie. However, the identification method is not limited to this. For example, metadata is added to identify them after capturing. Then, the movies can be identified by referring to the added metadata.

An outline of an operation when the digital camera 20 according to the present exemplary embodiment captures short movie image, is described. The present exemplary embodiment is described of a case where data up to "MVS_0002. MOV" (302) illustrated in FIG. 3A have been recorded, and new data "MVS_0003. MOV" (303) is recorded. The data "MVS_0003. MOV" is an example of first moving image data, and the data "MVS_0002. MOV" is an example of second moving image data.

The digital camera 20 according to the present exemplary embodiment provides a function that enables the user to easily check association of a just captured short movie with a short movie captured before it. The function is described below referring to drawings.

Figure 5A:
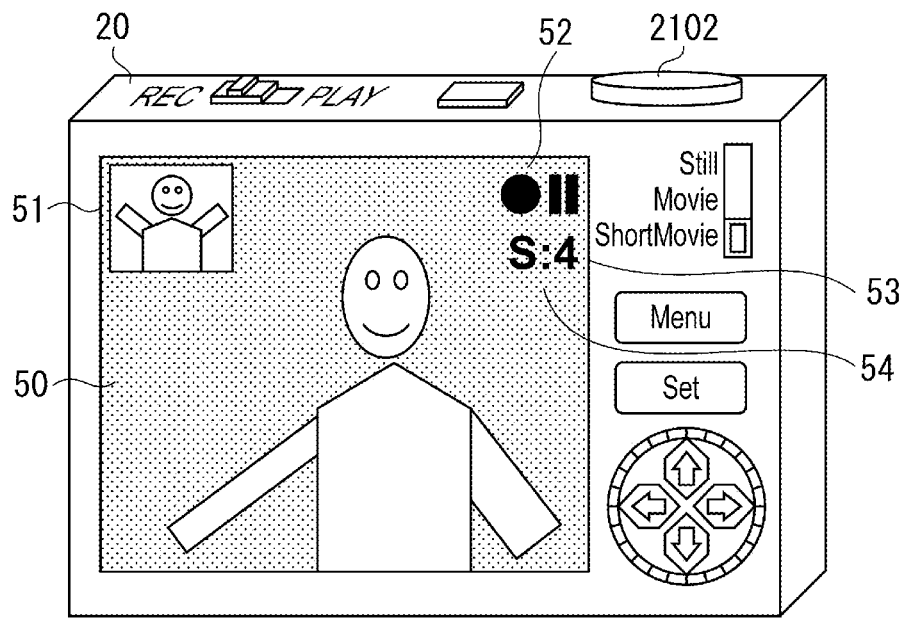
FIGS. 5A and 5B each illustrate an example of a screen display of the digital camera.

When the REC/PLAY mode changing switch 2106 is at the position "REC", and the imaging mode changing switch 2108 is set to the position "Short Movie", the digital camera 20 changes to the short movie mode. FIG. 5A illustrates a display content of the liquid crystal screen 209 in this case. FIG. 5A illustrates a display of the liquid crystal screen 209 in a standby state in the short movie mode.

In the standby state, the digital camera 20 captures an image of an object, and displays the captured object image as a live view image 50 on the liquid crystal screen 209. However, the digital camera 20 does not record the captured live view image as a file. The live view image 50 is for displaying the object image in real time. The user can determine an angle of view or a capturing timing.

In the screen illustrated in FIG. 5A, a standby display mark 52 indicates a standby (pause) state of movie recording. As described above, an image captured in this state cannot be recorded as a file.

A short movie mode mark 53 indicates that a current mode is a short movie mode, and a mark "S" is displayed. Recordable time 54 indicates remaining recordable time of a short movie by seconds.

FIG. 5A illustrates a state where recording is not yet started, and hence a maximum number of recording seconds "4" of the short movie in the present exemplary embodiment is used as remaining time. There is no such display in the normal movie mode. Thus, based on this display, the user can determine which of the normal movie mode and the short movie mode a current mode is.

In an area 51, a last frame of a latest short movie among the short movies recorded in the memory card 208 is displayed. Which moving image data is set as a latest short movie is described below. In other words, a frame displayed in the area 51 is connected to a short movie to be captured during continuous reproducing.

By referring to the frame displayed in the area 51 before image capturing, the user can determine an angle of view or a composition more in view of association between the short movies.

In the present exemplary embodiment, only the last frame is displayed in the area 51. However, among frames of the latest short movie, a frame of last predetermined time can be played. Thus, not still image data but moving image data is reproduced in the area 51, and the user can check association more easily.

On the screen illustrated in FIG. 5A, when the user presses the shutter button 2102, capturing of short movies is started. After the start of the image capturing, a screen illustrated in FIG. 5B is displayed.

Figure 5B:
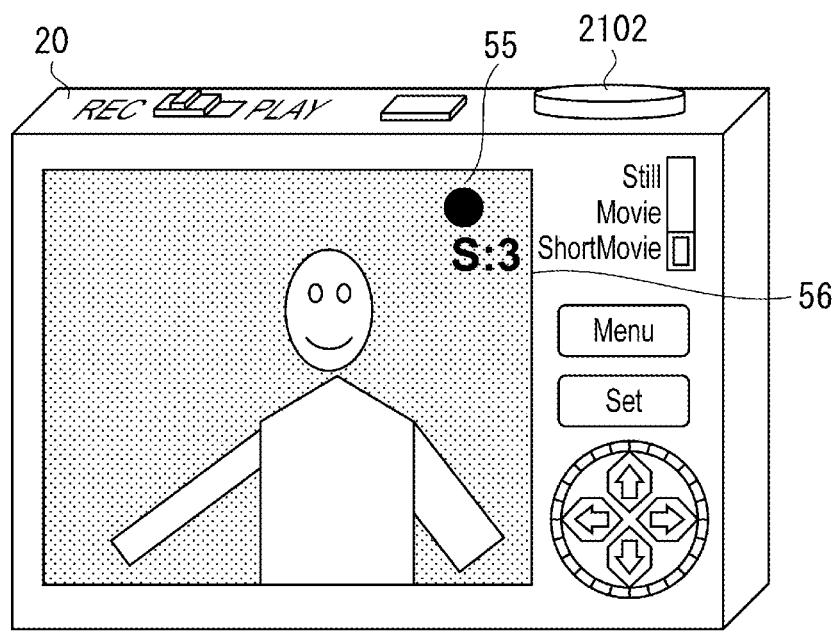

After the change to the screen illustrated in FIG. 5B, the standby display mark 52 changes to a recording mark 55. Numerical values of the recordable time 54 start to be counted down in order from "4". The user can accordingly check the remaining number of capturing seconds.

When the count becomes 0, the recording is automatically ended. After the end of the recording, a short movie file "MVS_0003. MOV" (303) is created based on the captured object image, and recorded in the memory card 208.

Next, screen displaying after the end of capturing is described. After the capturing of the short movie, the digital camera 20 according to the present exemplary embodiment automatically displays a checking screen to check a just captured short movie on the liquid crystal screen 209.

On the checking screen according to the present exemplary embodiment, not only the just captured short movie is played. First, a latest previously captured short movie is played, and then the just captured short movie is played. This checking screen is described in detail below.

Figure 6A:
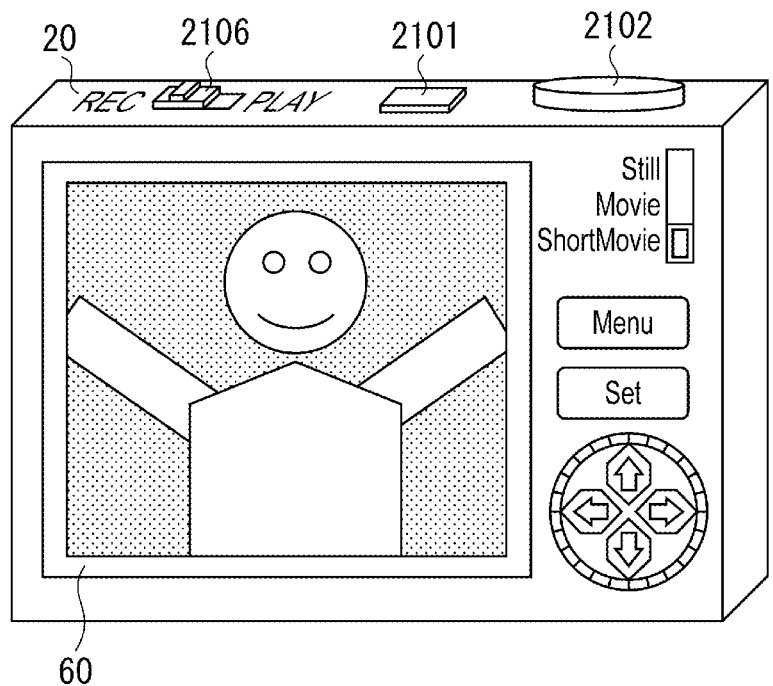
FIGS. 6A and 6B each illustrate an example of a screen display of the digital camera.

First, after the end of capturing the short movie, a screen illustrated in FIG. 6A is automatically illustrated. Displayed on the screen illustrated in FIG. 6A is not a just captured short movie but a latest previously captured short movie "MVS_0002. MOV" (302).

In the present exemplary embodiment, a last 1-second portion of the latest short movie "MVS_0002. MOV" (302) is reproduced. After a last frame of the short movie "MVS_0002. MOV" (302) has been reproduced on the screen illustrated in FIG. 6A, the displaying automatically changes to a screen displayed in FIG. 6B.

On this screen, moving image data corresponding to the just captured short movie, that is, "MVS_0003. MOV", is reproduced. The just captured short movie to be reproduced does not always need to be filed.

For example, while a short movie before filing, which has been recorded in the RAM 205, is reproduced on the checking screen, the just captured short movie may be simultaneously filed to be recorded in the memory card 208.

Thus, on the checking screen according to the present exemplary embodiment, the two moving image data are automatically reproduced in a continuous manner. Such a reproduction method is referred to as continuous reproduction. This continuous reproduction enables the user to check the just captured short movie including its association with last moving image data after the Image capturing.

In the checking screen according to the present exemplary embodiment, a notification is displayed to identify which of a just captured movie or a previously captured movie a currently played short movie is.

In the present exemplary embodiment, a frame 60 is displayed around the screen illustrated in FIG. 6A. However, notification is not limited to this method. For example, a certain mark may be displayed on the screen illustrated in FIG. 6B, or notification is executed by sound or light. This notification enables the user to easily recognize execution of continuous reproduction.

Figure 6B:
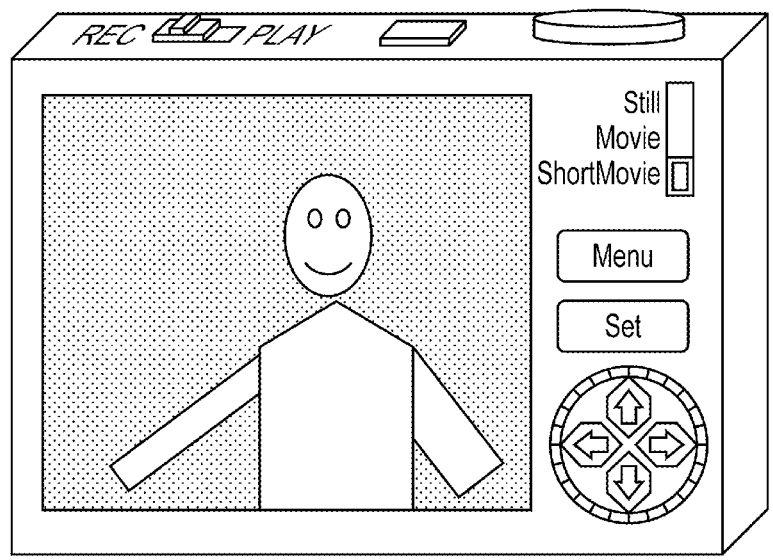

Thus, in the short movie mode, immediately after the image capturing, the displaying on the liquid crystal screen automatically changes to those illustrated in FIGS. 6A and 6B. When reproducing of a currently captured short movie ends in FIG. 6B, the processing automatically returns to the capturing standby state illustrated in FIG. 5A. In this case, a last frame of the short movie corresponding to the just captured movie "MVS_0003. MOV" is displayed in the area 51.

Figure 4:
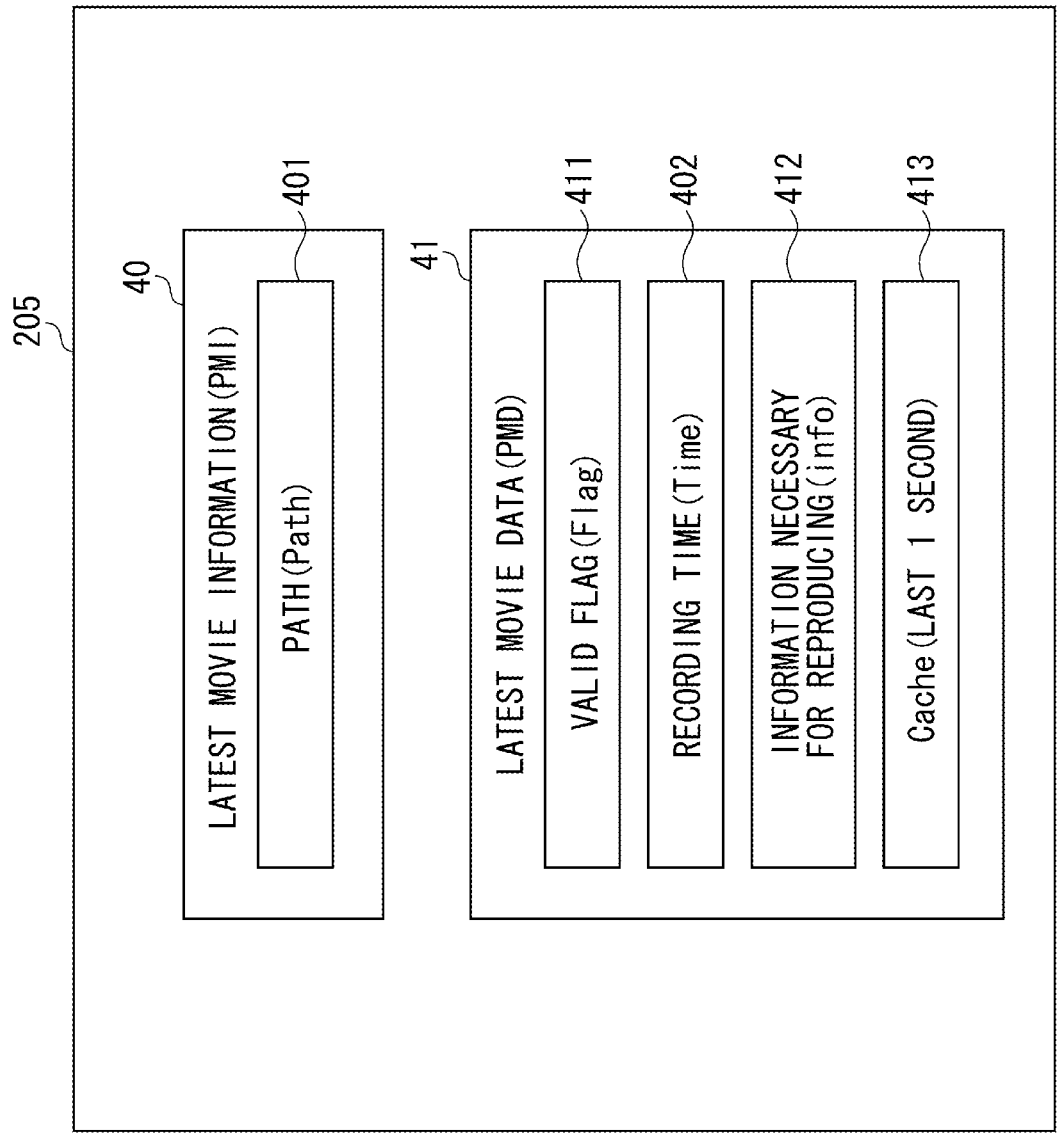
FIG. 4 illustrates an example of a data structure of continuous reproduction data.

Next, data to be used for executing continuous reproduction is described. FIG. 4 illustrates a data structure of continuous reproduction data. This continuous reproduction data has been recorded in the RAM 205 of the digital camera 20, and referred to by the CPU 202 during continuous reproduction. The continuous reproduction data is described below.

Latest movie information (PMI) 40 contains information to latest moving image data. Specifically, the PMI 40 contains a file path (Path) 401 to moving image data of latest image capturing date and time. Timing of updating the Path 401 is described below.

Latest movie data (PMD) 41 is video data of a latest short movie. The PMD 41 contains cache data (Cache) 413 indicating the video data itself and, when necessary, information (Info) 412 such as a bit rate necessary for reproducing the cache data, and recording time (Time) 402 of the short movie.

The PMD 41 also contains a valid flag (Flag) 411 indicating validity of the PMD 41. This flag takes a value of one of True and False. The True indicates that the PMD 41 contains information of a latest movie. The False indicates that the PMD 41 contains no information of a latest movie or contained dada is not valid. Both values are reset at the time of activating the digital camera.

Figure 7:
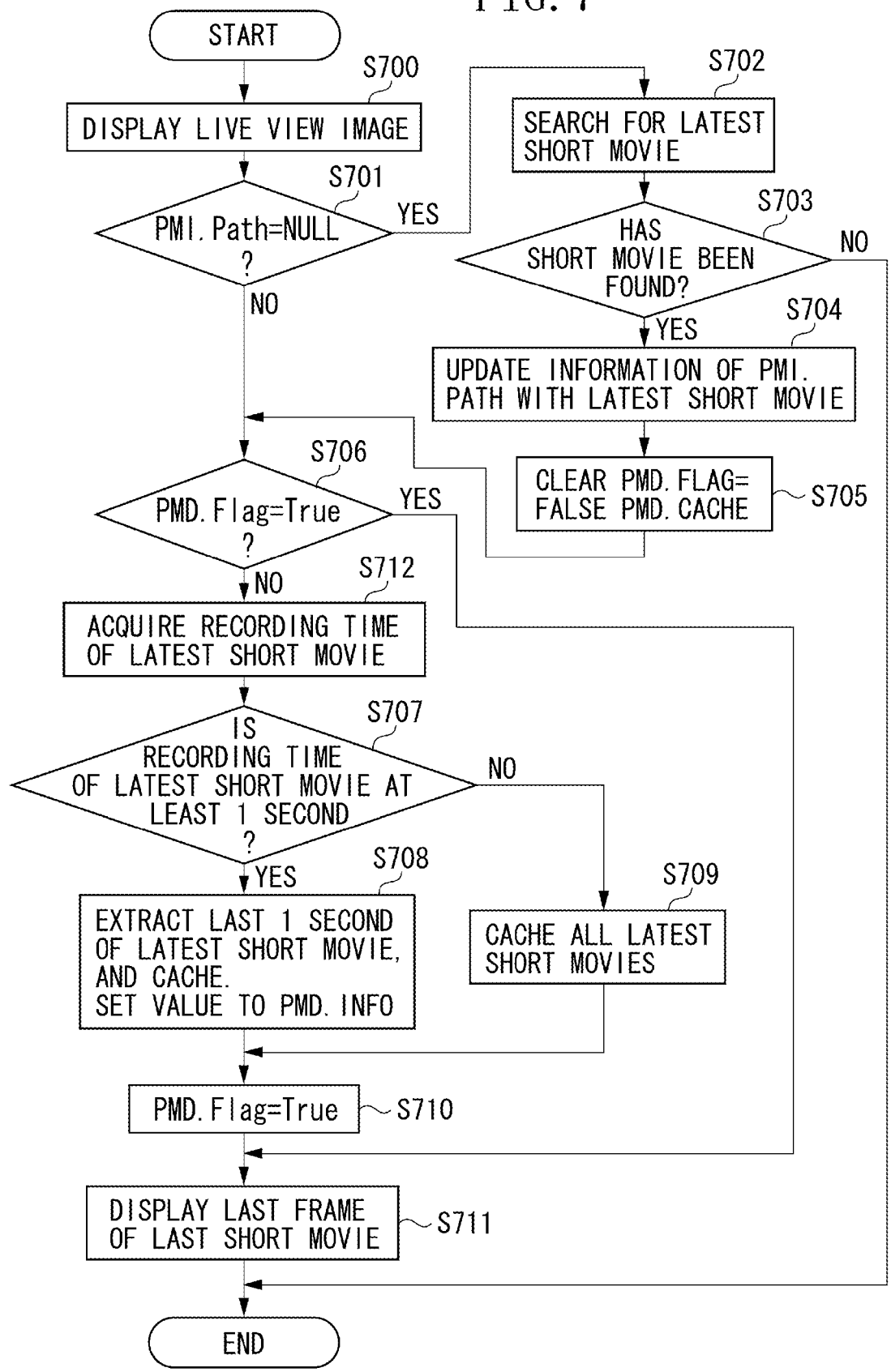
FIG. 7 is a flowchart illustrating an example of an operation of the digital camera.

Referring to a flowchart of FIG. 7, processing when the digital camera changes to the short movie mode is described. The processing of the flowchart is started when the digital camera is changed to the short movie mode by a user's operation.

First, in step S700, the CPU 202 displays the live view image 50 in response to a change of the digital camera to the short movie mode, thereby preparing for receiving a capturing instruction made by a user's instruction.

In step S701, the CPU 202 determines whether the Path 401 is NULL (invalid). This can be determined by investigating whether a value valid as a file path has been set in the Path 401. When the Path 401 is determined NULL (YES in step S701), the processing proceeds to step S702. When not NULL (NO in step S701), the processing proceeds to step S706.

In step S702, the CPU 202 searches for a short movie file recorded in the memory card 208. Specifically, the CPU 202 refers to a folder (in the example illustrated in FIG. 3A, "100_AAAA" folder) that has stored the short movie file.

When the folder includes a plurality of files, the CPU 202 searches for a latest movie file among them. The latest file is determined based on a date and time contained in metadata of the files. Generally, based on serial numbers of file names in capturing order, the CPU 202 can make determination by referring to file numbers (in the example illustrated in FIG. 3A, numerical values including last 4 characters of portions excluding extensions of the file names).

In step S703, the CPU 202 determines whether the latest short movie file has been found as a result of searching in step S702. When the file has been found (YES in step S703), the processing proceeds to step S704. When not found (NO in step S703), the processing is ended.

In step S704, the CPU 202 updates a value of the PMI 40 by using information of the file found as a result of searching in step S702. Specifically, the CPU 202 sets a path of the latest short movie file found in step S702 in the Path 401 (also referred to as PMI.Path) in the MPI 40.

In step S705, the CPU 202 sets the Flag 411 to False, and clears the Cache 413 to delete cached data.

In step S706, the CPU 202 determines whether the Flag 411 is True. When True (YES in step S706), the processing proceeds to step S711. When not True, namely, False, (NO in step S706), the processing proceeds to step S712.

The Flag 411 is set to False in step S705. Thus, when the processing proceeds to step S712, the CPU 202 determines that the Flag 411 is not True.

A case where the processing proceeds to step S712 is described. In step S712, the CPU 202 accesses the short movie file indicated by the Path 401 among the files stored in the memory card 208 to acquire recording time of the short movie. Specifically, the CPU 202 can acquire the recording time by analyzing the short movie file and referring to its metadata.

In step S707, the CPU 202 determines whether the recording time acquired in step S712 is at least 1 second. When the recording time is at least 1 second (YES in step S707), the processing proceeds to step S708. When not at least 1 second (NO in step S707), the processing proceeds to step S709.

In step S708, the CPU 202 accesses the short movie file indicated by the Path 401 among the files stored in the memory card 208 to extract stream data of last 1 second.

The CPU 202 reads the extracted stream data to the RAM 205 to set its pointer in the Cache 413. The CPU 202 stores information necessary for reproducing data indicated by the Cache 413 as a moving image in the Info 412 based on the extracted stream data.

In step S709, the CPU 202 reads the short movie file indicated by the Path 401 to the RAM 205 to set its pointer in the Cache 413.

Through steps S708 and S709, a pointer containing the stream data indicating a portion of last 1 second or the entire movie in the latest short movie is set in the Cache 413. After steps S708 and S709, in step S710, the CPU 202 sets the Flag 411 to True, indicating that the PMD 41 contains information of the latest short movie.

As described above, according to the present exemplary embodiment, the CPU 202 determines which moving image data is set as a latest short movie at the timing of the change of the digital camera to the short movie mode, and updates the continuous reproduction data stored in the RAM 205. Even when a new image is captured in the short movie mode, the continuous reproduction data may be updated. This processing is described below.

In step S710, the CPU 202 extracts a last frame of the short movie indicated by the Path 401, and superimposes the last frame on the live view image 50 to display it on the display unit 206. As a result of this processing, the displaying in the area 51 illustrated in FIG. 5A is achieved.

The latest short movie can be reproduced in the area 51 as described above. In this case, in step S710, the CPU 202 reads the short movie indicated by the Path 401, and superimposes the short movie on the live view image 50 to reproduce it.

The short movie is first stored in the RAM 205 after image capturing as described below. Thus, the short movie can be stored in the RAM 205 for a predetermined period after the image capturing, and directly read from the RAM 205 when the short movie is displayed in the area 51. The processing when the digital camera changes to the short movie mode has been described.

Figure 8:
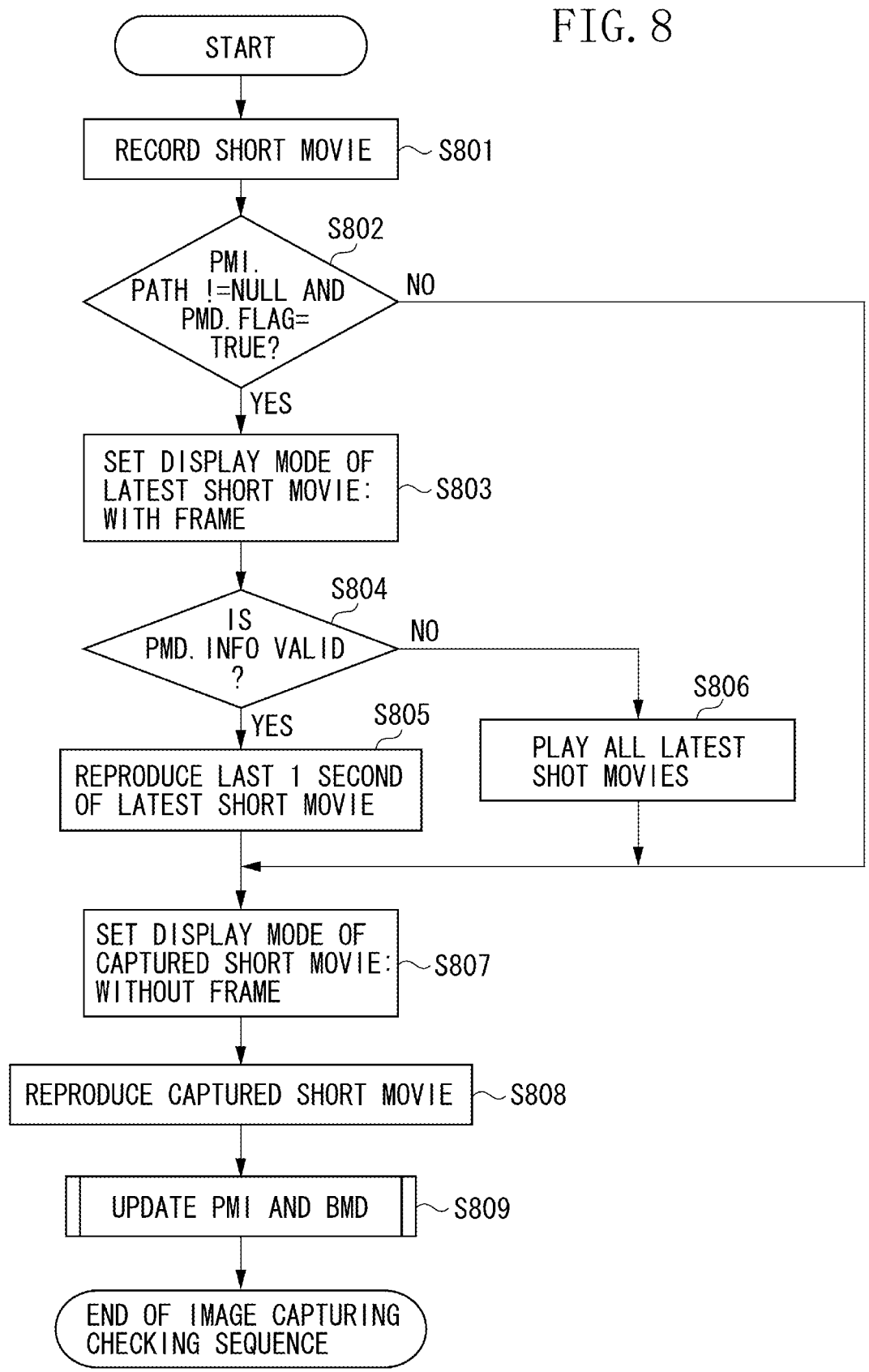
FIG. 8 is a flowchart illustrating an example of an operation of the digital camera.

Next, referring to a flowchart of FIG. 8, processing after image capturing in the short movie mode is described. This processing flow is started in response to the end of capturing of the moving image after a passage of predetermined time in the short movie mode.

First, in step S801, the CPU 202 records moving image data acquired by image capturing in the RAM 205.

In step S802, the CPU 202 refers to the Path 401 and the Flag 411 to determine whether the Path 401 is NULL and whether the Flag 411 is True. This step is for investigating whether information of a latest movie has been stored in the PMI 40 and the PMD 41.

In subsequent steps, the CPU 202 performs processing of displaying a checking screen after image capturing. Particularly, in steps S803 and after, latest one among moving image data recorded in the past is displayed as illustrated in FIG. 6A, and the just captured moving image data recorded in step S801 is displayed. This processing is described.

In step S803, the CPU 202 sets "with frame" on the checking screen. This setting is for displaying or not displaying the frame 60 illustrated in FIG. 6A on the checking screen, and one of "with frame" and "without frame" can be set.

In step S804, the CPU 202 determines whether a value has been set in the Info 412. When the value has been set (YES in step S804), the processing proceeds to step S805. When not set (NO in step S804), the processing proceeds to step S806. This processing is for determining which of a last 1-second portion and an entire portion of a short movie the moving image data stored in the Cache 413 is.

In step S805, the CPU 202 reproduces the moving image data stored in the Cache 413 on the checking screen by using information stored in the Info 412. In other words, a last 1-second portion of the latest movie is reproduced.

In step S806, the CPU 202 reproduces data of the Cache 413. In other words, the entire portion of the latest short movie is played. Through this processing, the screen illustrated in FIG. 6A is displayed. The processing for reproducing the latest short movie on the checking screen has been described. In steps S807 and thereafter, processing for displaying the moving image data recorded in step S801 on the checking screen is performed.

When it is determined that the information of the latest short movie has been stored in the PMI 40 and the PMD 41 (YES in step S802), steps S807 and thereafter are executed after steps S803 to S806. In other words, after the latest short movie has been reproduced on the checking screen, the just captured moving image data recorded in step S801 is subsequently reproduced.

When it is determined that the information of the latest short movie has not been stored in the PMI 40 or the PMD 41 (NO in step S802), steps S807 and thereafter are executed without executing steps S803 to S806. In other words, the just captured moving image data is reproduced from the start on the checking screen.

Steps S807 and thereafter are described. In the present exemplary embodiment, the CPU 202 automatically executes steps S807 to S809 after reproduction in step S805 or S806.

In step S807, the CPU 202 sets "without frame" on the checking screen. The frame 60 is accordingly not displayed. In step S808, the CPU 202 reproduces the moving image data recorded in step S801. Through this processing, the screen illustrated in FIG. 6B is displayed.

After the reproduction in step S808, in step S809, the CPU 202 updates the PMI 40 and the PMD 41. Specifically, processing similar to that of steps S802 to S811 illustrated in FIG. 7 is executed to update the latest short movie information to information of the moving image data recorded in step S801. The processing after image capturing in the short movie mode has been described.

As described above, according to the present exemplary embodiment, on the checking screen after the short movie has been captured, the latest short movie captured in the past is reproduced first, and the just captured moving image data is subsequently reproduced. This enables the user to check, on the checking screen, when the moving image data is recorded, not only a content of the just captured moving image data but also its association with the previously recorded moving image data.

According to the present exemplary embodiment, the last frame that is a part of the latest short movie is superimposed on the live view image to be displayed. This displaying enables the user to determine timing of starting new image capturing in view of association with the latest short movie.

According to the present exemplary embodiment, the latest movie data is cached in response to the change of the digital camera to the short movie mode.

The reason is as follows. For example, a certain period of time is necessary for extracting stream data of 1 second from the moving image data. Thus, even when the stream data is extracted at a stage where the checking screen is displayed, the processing may not be executed in time.

Thus, according to the present exemplary embodiment, latest movie data is read to the RAM 205 to be prepared beforehand in response to the change to the short movie mode. This processing enables smooth continuous reproduction on the checking screen.

The continuous reproduction according to the present exemplary embodiment is executed only on the checking screen in the short movie mode. In the normal movie mode, no checking screen for continuous reproduction is displayed. It is because moving image data recorded in the normal movie mode lasts for several tens to several seconds in many cases, and continuous reproduction is likely to be long.

Figure 9:
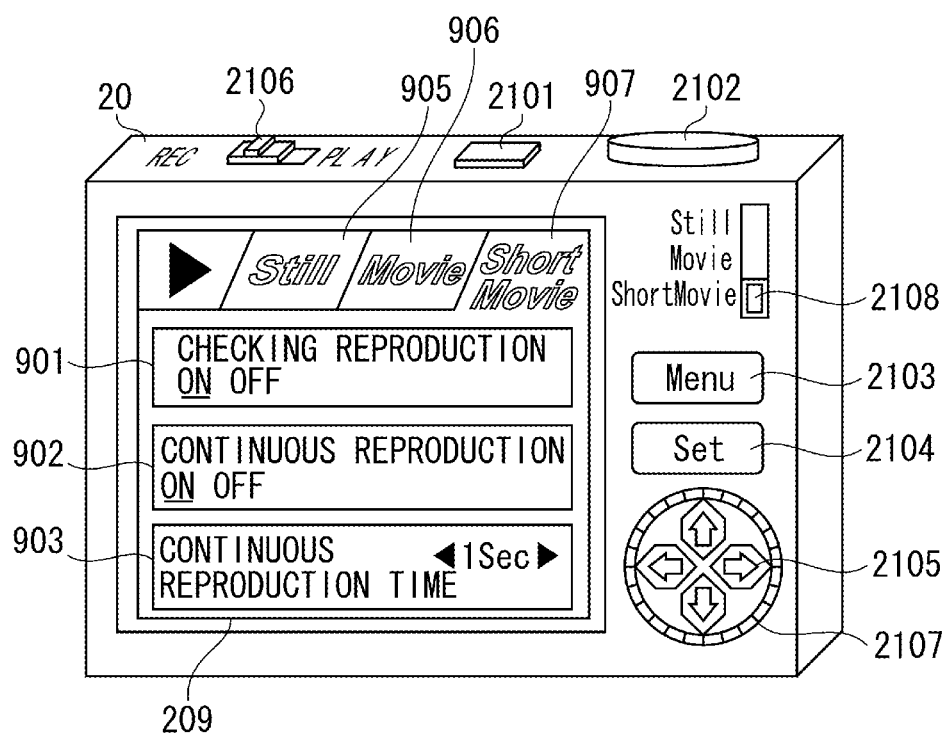
FIG. 9 is a flowchart illustrating an example of an operation of the digital camera according to the present exemplary embodiment.

FIG. 9 illustrates an example of a setting screen displayed on the display unit 206 of the digital camera 20. The digital camera according to the present exemplary embodiment can select various settings regarding continuous reproduction by a user's operation. This setting is described below.

Tabs 905 to 907 are for selecting setting targets. When a still image tab 905 is selected, a setting screen for still image capturing is displayed. When a normal movie tab 906 is selected, a setting screen for normal movie capturing is displayed. In FIG. 9, the short movie tab 907 is selected, and a setting screen for short movie capturing is displayed.

A menu 901 is for setting whether to display a checking screen after the end of capturing a short movie. When "ON" is set, the digital camera 20 displays the checking screen after the capturing end of the short movie. When "OFF" is set, the digital camera 20 does not display any checking screen after the capturing end of the short movie. Needless to say, the digital camera 20 does not perform any continuous reproduction.

A menu 902, which can be set when the menu 901 is "ON", can set whether to execute continuous reproduction on the checking screen. When "ON" is set, the digital camera 20 executes continuous reproduction. When "OFF" is set, the digital camera 20 does not execute any continuous reproduction. Setting carried out on this menu 902 is an example of a first setting.

A menu 903 is for setting reproduction time of the latest short movie during the continuous reproduction. The reproduction time of the latest short movie is 1 second as described above. However, when the setting of the menu 903 is changed, the reproduction time is also changed. Steps S707 and S708 illustrated in FIG. 7 are executed based on time set on the menu 903.

On the menu 903, time cannot be set exceeding maximum recording time of the short movie. For example, in the present exemplary embodiment, the maximum recording time of the short movie is 4 seconds, and hence time equal to or more than 4 seconds cannot be displayed as selectable time on the menu 903. Setting carried out on this menu 903 is an example of a second setting.

The digital camera 20 according to the present exemplary embodiment can execute a slide show of the short movie. The screen illustrated in FIG. 6B is displayed by a user's predetermined operation.

When the user executes an operation to select "YES" on this screen, the digital camera 20 starts a slide show to sequentially play short movies on the display unit 206. Specifically, the CPU 202 plays the short movies stored in "100_AAAA" illustrated in FIG. 3A in order of the file names. In other words, the CPU 202 sequentially plays "MVS_001. MOV", "MVS_002. MOV", and "MVS_003. MOV".

Through this processing, for example, short movies of 4 seconds are continuously played, and a dramatic effect such as a slide show of a snapshot of a still image can be provided even in the case of moving image data.

A second exemplary embodiment is described next. According to the first exemplary embodiment, the latest moving image data present in the short movie folder is used as the latest short movie.

The present exemplary embodiment is directed to a case where the same folder stores not only a short movie but also a normal movie and a still image in a mixed manner. The present exemplary embodiment has many portions similar to those of the first exemplary embodiment, and thus description of the similar potions is omitted. Only portions unique to the present exemplary embodiment are described.

FIG. 3B illustrates a directory structure in a memory card 208 according to the present exemplary embodiment. In an example illustrated in FIG. 3B, a "100_AAAA" folder stores still image data 311, 312, and 315, a normal movie 314, and short movies 313 and 316. In other words, the memory card 208 according to the present exemplary embodiment stores, in one folder, still images, a normal movie, and short movies in a mixed manner.

Referring to FIG. 7, processing when a digital camera changes to a short movie mode is described. The processing of the flowchart is started when the digital camera is changed to the short movie mode by a user's operation.

A difference of the processing illustrated in FIG. 7 from that of the first exemplary embodiment is a latest short movie searching method. In step S702, a CPU 202 searches data stored in the "100_AAAA" folder for a latest short movie.

As described above, the "100_AAAA" folder stores the still images and the normal movie in the mixed manner. However, the CPU 202 targets none of the still image and the normal movie as a latest short movie.

For example, in a state illustrated in FIG. 3B, the CPU 202 selects, none of "IMG_0005. JPG" and "MVI_0004. MOV", but "MVS_0003. MOV" as a latest short movie. File names of the normal movie and the short movie have identical extensions "MOV", and hence the CPU 202 cannot distinguish the two from each other even by referring to the extensions. Thus, according to the present exemplary embodiment, the CPU 202 distinguishes the normal movie and the short movie from each other based on whether prefixes are "MVS_".

In step S703, the CPU 202 determines whether a latest short movie has been found. When found (YES in step S703), the processing proceeds to step S704. When not found (NO in step S703), the processing is ended.

According to the present exemplary embodiment, even when there is a mixture of a plurality of types of files in one folder, the short movie can be processed as a latest short movie.

Next, a third exemplary embodiment is described. In the first and second exemplary embodiments, the short movie having a latest image capturing date is used as the latest short movie for the continuous reproduction. However, the short movie of the latest image capturing date may not always be appropriate for the continuous reproduction.

For example, when a short movie B is captured after a short movie A has been captured, continuous reproduction of A→B is carried out on a checking screen after the short movie B has been captured. When not satisfied with connection of A→B, a user may execute capturing again to acquire moving image data to be continued with the short movie A, and acquire a new short movie C.

In this case, what the user wants to check on the checking screen after the short movie C has been captured is not its association with the short movie B captured immediately before but its association with the short movie A. Hence, continuous reproduction of not B→C but A→C is to be executed.

Therefore, the present exemplary embodiment enables continuous reproduction reflecting user's intension. A detailed operation is described. The present exemplary embodiment has many portions similar to those of the first and second exemplary embodiments, and thus description of the similar portions is omitted. Portions unique to the present exemplary embodiment are described.

Figure 10A:
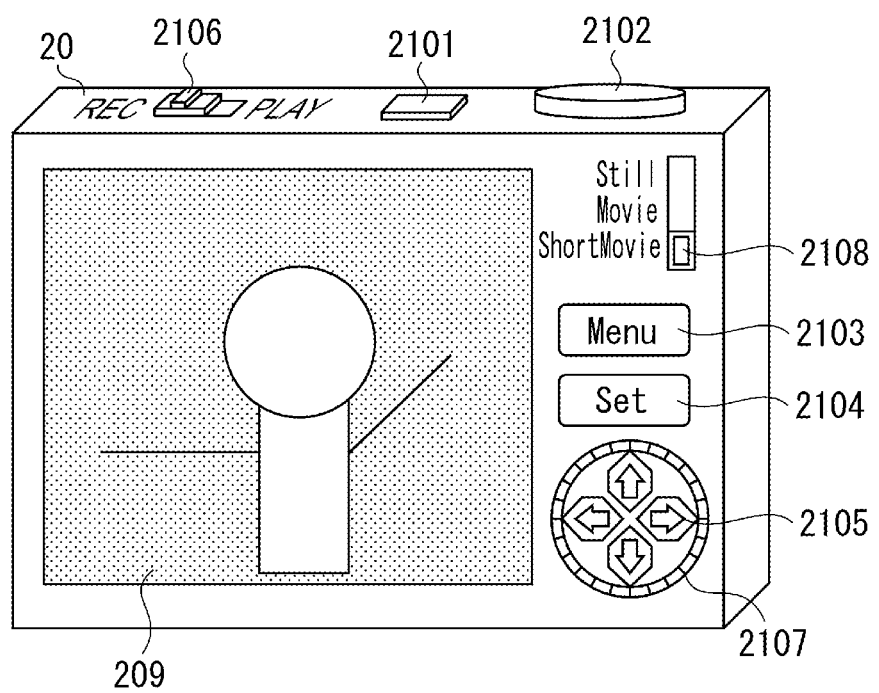
FIGS. 10A to 10C each illustrate an example of a screen display of a digital camera according to a third exemplary embodiment.
Figure 10B:
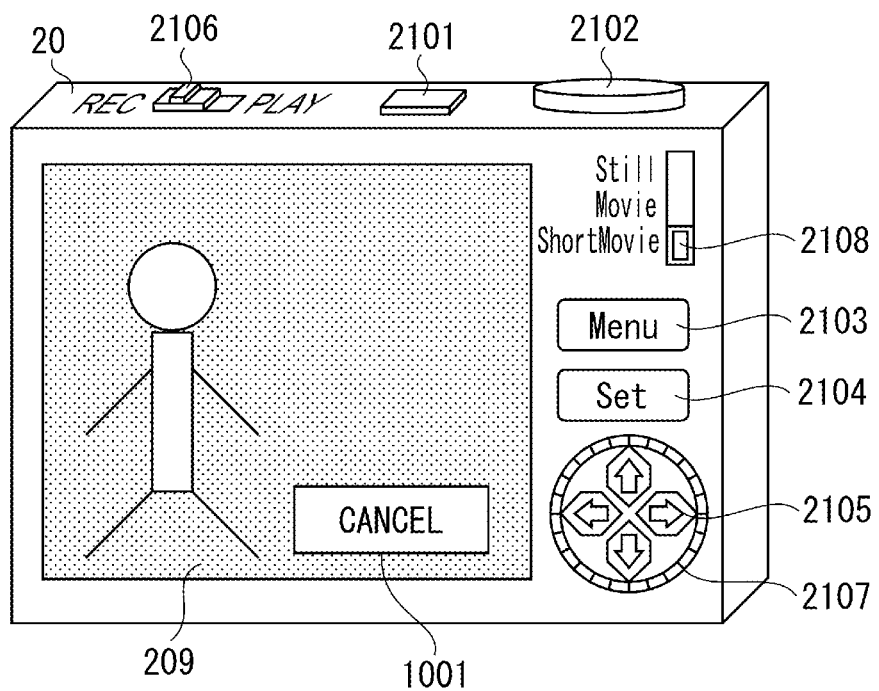
Figure 10C:
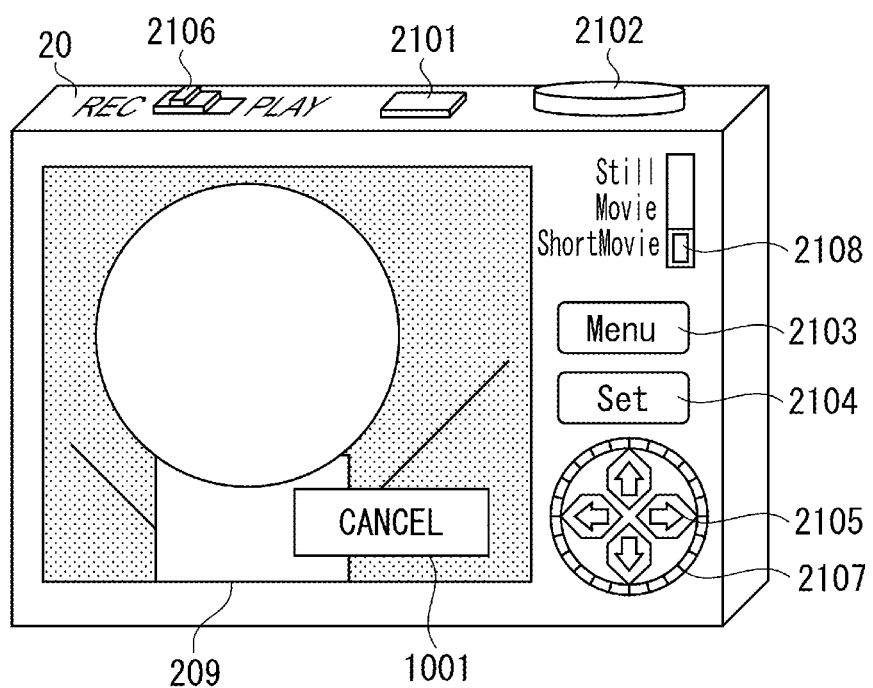

Each of FIGS. 10A to 10C illustrates a display example of continuous reproduction according to the present exemplary embodiment. A latest short movie is set to "MVS_0001. MOV".

When a new short movie "MVS_0002. MOV" is captured in the state where the latest short movie is set to "MVS_0001. MOV", on the checking screen, first as illustrated in FIG. 10A, a last 1-second portion of the short movie "MVS_0001. MOV" is reproduced.

Then, continued with the last 1-second portion of the short movie "MVS_0001. MOV", the just captured short movie "MVS_0002. MOV" is reproduced as illustrated in FIG. 10B. A cancel button 1001 is displayed on the screen illustrated in FIG. 10B.

When the cancel button 1001 is selected, the short movie "MVS_0002, MOV" is removed from a target of the continuous reproduction during next short movie capturing. In other words, the short movie "MVS_0001. MOV" is kept set as the latest short movie without updating the continuous reproduction data 205.

Specifically, when the cancel button 1001 is selected, additional information indicating that the short movie "MVS_0002. MOV" is not targeted for the continuous reproduction is associated. The short movie with which the additional information has been associated is not targeted for searching in step S702 illustrated in FIG. 7.

A case where another new short movie "MVS_0003. MOV" is captured in this state is discussed. In this case, on the checking screen, not the canceled short movie "MVS_0002. MOV" but the last 1-second portion of the short movie "MVS_0001. MOV" illustrated in FIG. 10A is played. Then, continued with the last 1-second portion of the short movie "MVS_0001. MOV", the short movie "MVS_0003. MOV" is reproduced as illustrated in FIG. 10C.

Thus, when not satisfied with the association, the user who has checked the continuous reproduction captures a new short movie again, and can check the continuous reproduction again.

When the cancel button 1001 is selected, a short movie (short movie illustrated in FIG. 10B in the present exemplary embodiment) being displayed on the checking screen may not be recorded in the memory card 208 (when already recorded, the short movie may be deleted from the memory card 208).

The embodiments are only examples of the present invention, and thus in noway limitative of the invention. For example, the exemplary embodiments can be appropriately combined.

The present invention can also be achieved by executing the following processing. Software (programs) for achieving the functions of the exemplary embodiments is supplied to a system or an apparatus via a network or various storage media, and a computer (or CPU or Micro Processing Unit (MPU)) of the system or the apparatus reads the programs to execute them.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-293010 filed Dec. 28, 2010, which is hereby incorporated by reference herein in its entirety.

What is claimed is:

1. An imaging apparatus comprising:
an imaging unit configured to execute imaging in a first imaging mode for capturing a moving image for a predetermined period of time and then automatically stopping the capturing of the moving image, and a second imaging mode for capturing the moving image for a period longer than the predetermined period of time; and
a reproduction unit configured to automatically reproduce, after imaging executed by the imaging unit, moving image data acquired by the imaging,
wherein, if first moving image data is acquired by the imaging in the first imaging mode, the reproduction unit continuously reproduces second moving image data captured before the capturing of the moving image related to the first moving image data and acquired by the imaging in the first imaging mode, and the first moving image data, and
wherein the capturing of the second moving image data is executed for a predetermined period of time and then automatically stops in the same manner as the capturing of the first moving image data.

2. The imaging apparatus according to claim 1, wherein the reproduction unit reproduces, among the moving image data captured before the capturing of the moving image related to the first moving image data and acquired by the imaging in the first imaging mode, moving image data having a latest image capturing date as the second moving image data.

3. The imaging apparatus according to claim 1, wherein the reproduction unit does not reproduce any moving image data acquired by the imaging in the second imaging mode as the second moving image data.

4. The imaging apparatus according to claim 1, wherein the reproduction unit reproduces a part of moving image data containing a last frame as the second moving image data.

5. The imaging apparatus according to claim 1, further comprising a notification unit configured to give, if the reproduction unit continuously reproduces the second moving image data and the first moving image data, a notification to identify which of the first moving image data and the second moving image data currently reproduced moving image data is.

6. The imaging apparatus according to claim 1, further comprising a first setting unit configured to set whether to start reproduction of the second moving image data before reproduction of the first moving image data is started.

7. The imaging apparatus according to claim 1, further comprising a second setting unit configured to set time of reproducing the second moving image data before reproduction of the first moving image data is started.

8. The imaging apparatus according to claim 1, further comprising a cache unit configured to cache moving image data used as the second moving image data,
wherein the reproduction unit reproduces the moving image data cached by the cache unit as the second moving image data.

9. The imaging apparatus according to claim 8, wherein the cache unit starts, in response to a change of the imaging apparatus to the first imaging mode, caching the moving image data to be used as the second moving image data.

10. A method for controlling an imaging apparatus, comprising:
executing imaging in a first mode for capturing a moving image for a predetermined period of time and then automatically stopping the capturing of the moving image and a second imaging mode for capturing the moving image for a period longer than the predetermined period of time; and
automatically reproducing, after the imaging, moving image data acquired by the imaging,
wherein, if first moving image data is acquired by the imaging in the first imaging mode, second moving image data captured before capturing of the moving image related to the first moving image data and acquired by the imaging in the first imaging mode, and the first moving image data are continuously reproduced, and
wherein the capturing of the second moving image data is executed for a predetermined period of time and then automatically stops in the same manner as the capturing of the first moving image data.

11. A non-transitory computer-readable recording medium recording a program for causing a computer to function as the apparatus of claim 1.

* * * * *